Figure 1:
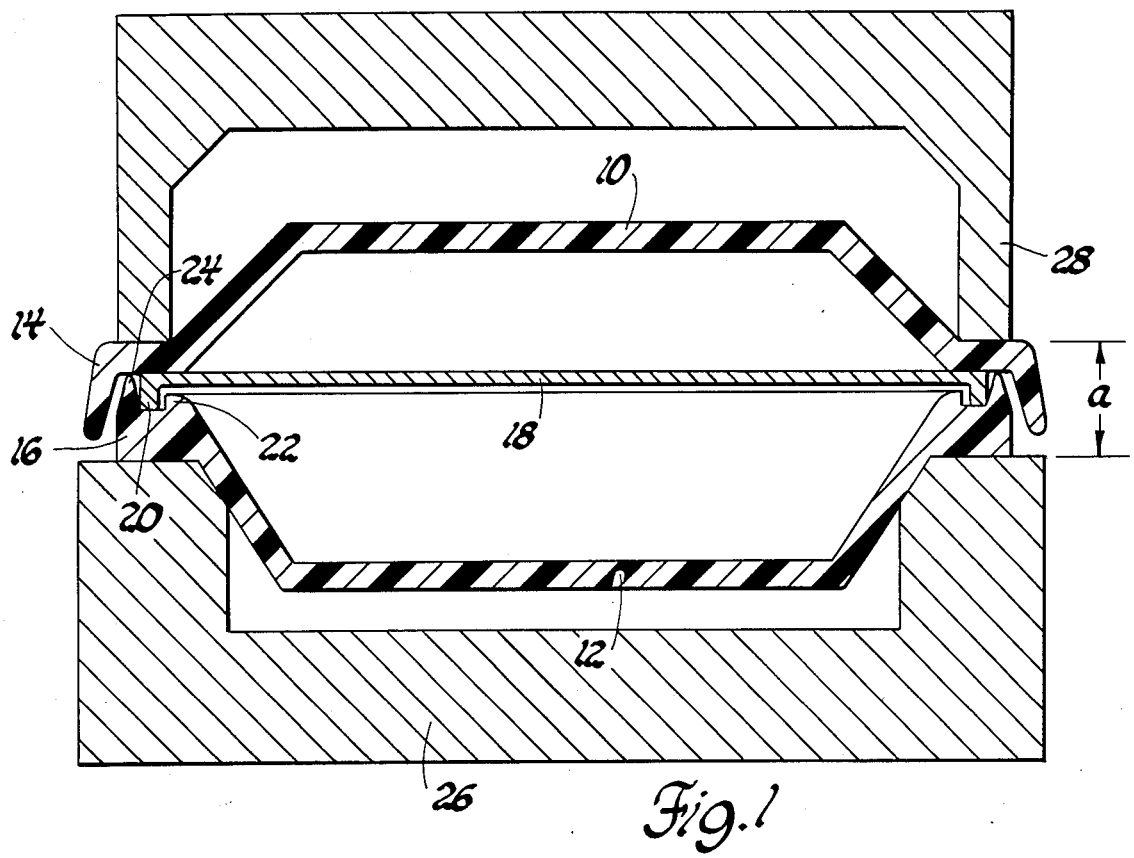

United States Patent [19]

Peter

[11] Patent Number: 4,631,685

[45] Date of Patent: Dec. 23, 1986

[54] METHOD AND APPARATUS FOR ULTRASONIC PLASTIC FORMING AND JOINING

[75] Inventor: David A. Peter, Anderson, Ind.

[73] Assignee: General Motors Corporation, Detroit, Mich.

[21] Appl. No.: 679,364

[22] Filed: Dec. 7, 1984

[51] Int. Cl.$^4$ .............................................. G06F 15/46
[52] U.S. Cl. .................................... 364/476; 364/473; 364/477; 156/73.1; 156/73.4; 156/350; 156/378; 156/580.1; 156/64; 228/1.1; 228/9; 264/23; 264/40.1; 264/40.5; 425/174.2; 425/29
[58] Field of Search ........................ 364/473, 476, 477; 29/878, 882; 156/64, 73.1, 73.4, 293, 350, 358, 360, 378, 379.6, 580.1, 580.2; 228/1.1, 8, 9, 18; 264/23, 248, 249, 40.1, 40.5; 425/174.2, 29

[56] References Cited

U.S. PATENT DOCUMENTS

| | | | |
|---|---|---|---|
| 3,602,257 | 8/1971 | Berleyoung et al. | 264/23 |
| 3,874,963 | 4/1975 | Barger | 156/73.4 |
| 3,925,139 | 12/1975 | Simmons | 156/358 |
| 4,047,992 | 9/1977 | Williams et al. | 156/73.1 |
| 4,159,220 | 6/1979 | Bosche et al. | 156/358 |
| 4,301,343 | 11/1981 | Jonelis | 156/73.1 |
| 4,410,381 | 10/1983 | Chapman, II | 156/64 |
| 4,549,269 | 10/1985 | LaPointe et al. | 364/476 |

FOREIGN PATENT DOCUMENTS 2094999 9/1982 United Kingdom ............... 364/476

*Primary Examiner*—Jerry Smith
*Assistant Examiner*—John R. Lastova
*Attorney, Agent, or Firm*—Warren D. Hill

[57] ABSTRACT

Accurate dimensional control in ultrasonic welding or upsetting of plastic parts is accomplished by the method and apparatus for monitoring the ultrasonic head displacement and sensing when a predetermined trigger force is applied to the part or parts, turning on the ultrasonic energy at the trigger point and terminating the ultrasonic energy when head displacement from the trigger point reaches an empirically established value, holding the force for a hold time and measuring the maximum displacement value at the end of the hold time, releasing the force when the force returns to the trigger point, measuring the overall displacement, and determining whether the overall displacement is within allowable tolerance values. Weld time and weld energy as well as the overall head displacement are monitored for comparison with preset tolerance values to determine acceptability of the part being processed.

8 Claims, 8 Drawing Figures

METHOD AND APPARATUS FOR ULTRASONIC PLASTIC FORMING AND JOINING

This invention relates to a method and apparatus for ultrasonic welding or upsetting of plastic parts and more particularly to a method and apparatus for dimensional control of the work piece during such ultrasonic processing.

The assembly of products containing plastic parts is often accomplished by ultrasonic welding to join together adjacent plastic parts or by ultrasonic deforming or upsetting to stake one part to another. The expression "ultrasonic processing" as used herein, means such ultrasonic welding or upsetting. Control techniques based on the measurement of the ultrasonic energy and its time of application to the part are well known for assuring good weld quality or the quality of the upset. Since these ultrasonic processing techniques involve heating portions of the plastic parts to a degree allowing softening and deformation of the parts under pressure, a dimensional change in the parts takes place so that if the dimensional change varies from one work piece to the next, a non-uniform product will result. In many applications, the final dimension of the product or the dimensional change during processing is important to its acceptability. As a consequence, an ultrasonic processing technique controlled on the basis of time and energy alone may result in products having a low yield of acceptable parts.

It is therefore an object of this invention to provide a method and apparatus for dimensional control of ultrasonic processing of plastic parts.

The invention is carried out by a method of applying force to a work surface and sensing a preset force value, measuring the surface position to establish an initial dimension when the preset force value is obtained, initiating ultrasonic energy application to the work, monitoring surface displacement occurring after initiating the ultrasonic energy, terminating the ultrasonic energy when the surface displacement reaches a preset value, maintaining force on the work surface for a hold period and then releasing the force, and measuring the overall surface displacement when the force is at the preset value to determine the dimensional change due to deformation of the work.

The invention is also carried out by ultrasonic apparatus having a head for contacting a part surface and applying force and ultrasonic energy to the part, a sensor for measuring the position of the head and generating a position signal, a preset force detector for generating a trigger signal and a microprocessor based controller responsive to the trigger signal and the position signal programmed to store the head position value and initiate ultrasonic energy when the trigger signal is received, determine when the head travel subsequent to the trigger signal reaches a preset value, and then terminate the ultrasonic energy when the preset hold time elapses, release the pressure on the part to effect removal of the trigger signal, measure the final head position value when the trigger signal is removed, and determine overall displacement from the initial and final head position values.

Figure 2:
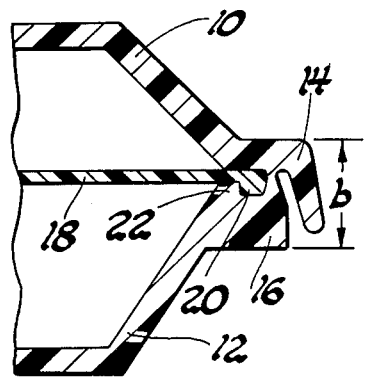
Figure 3:
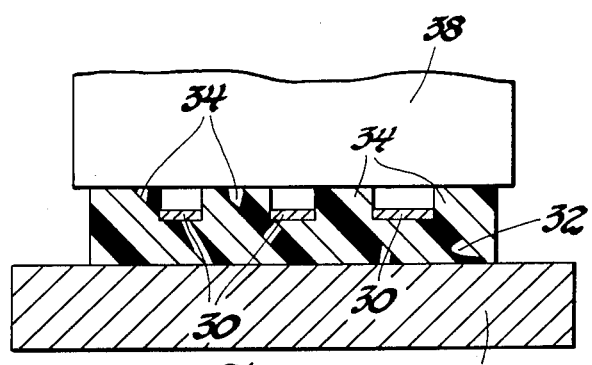
Figure 4:
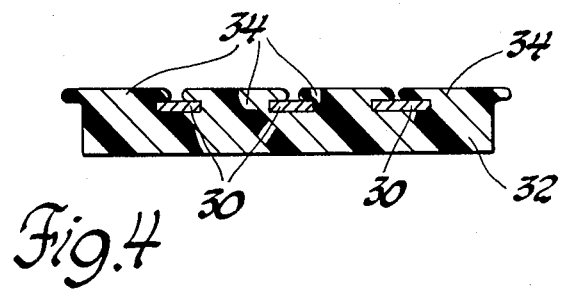
Figure 5:
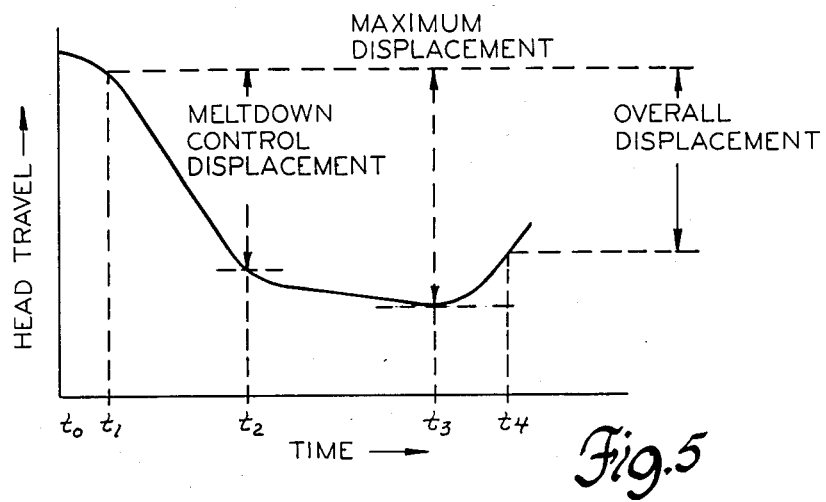
Figure 6:
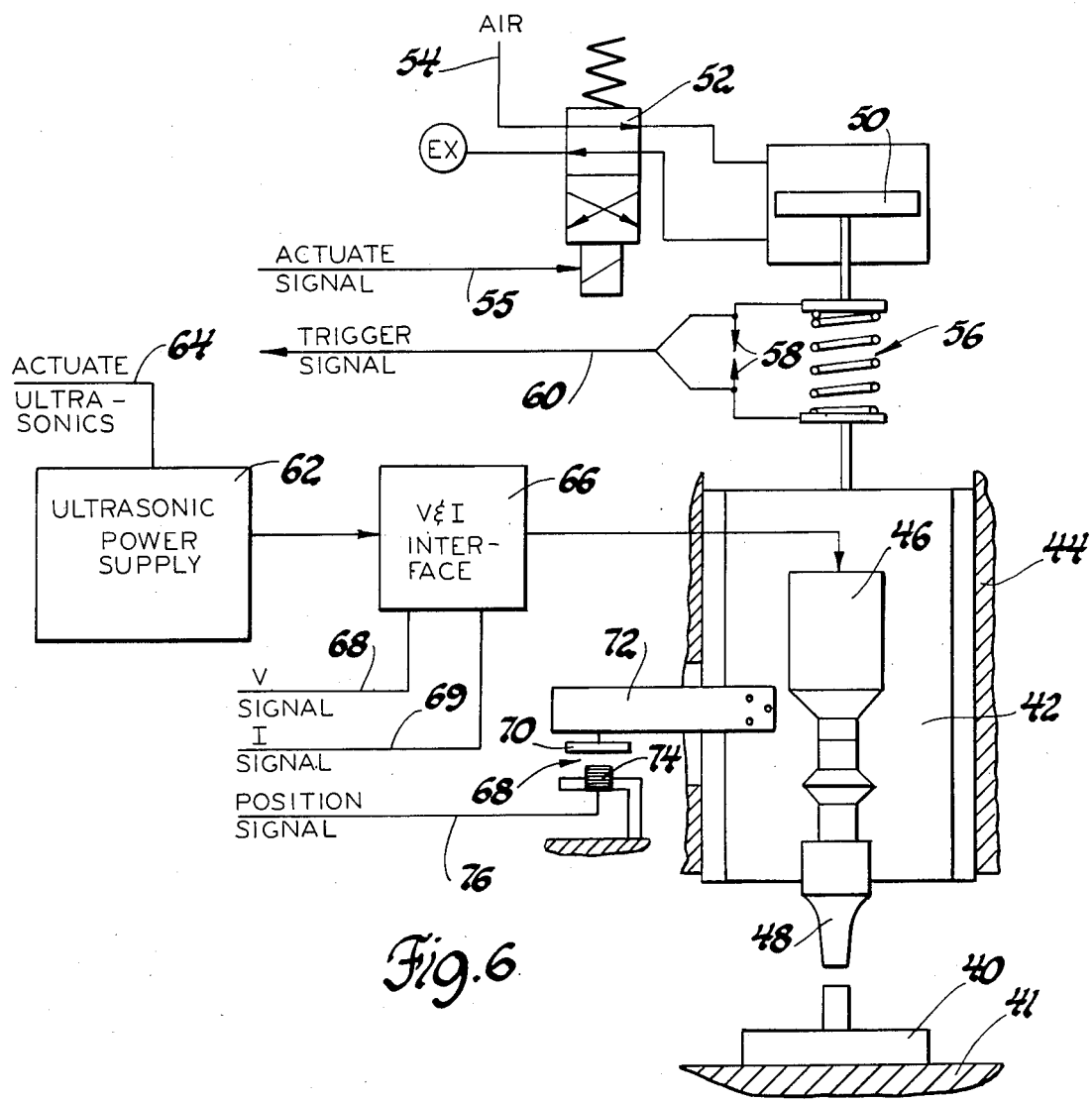
Figure 7:
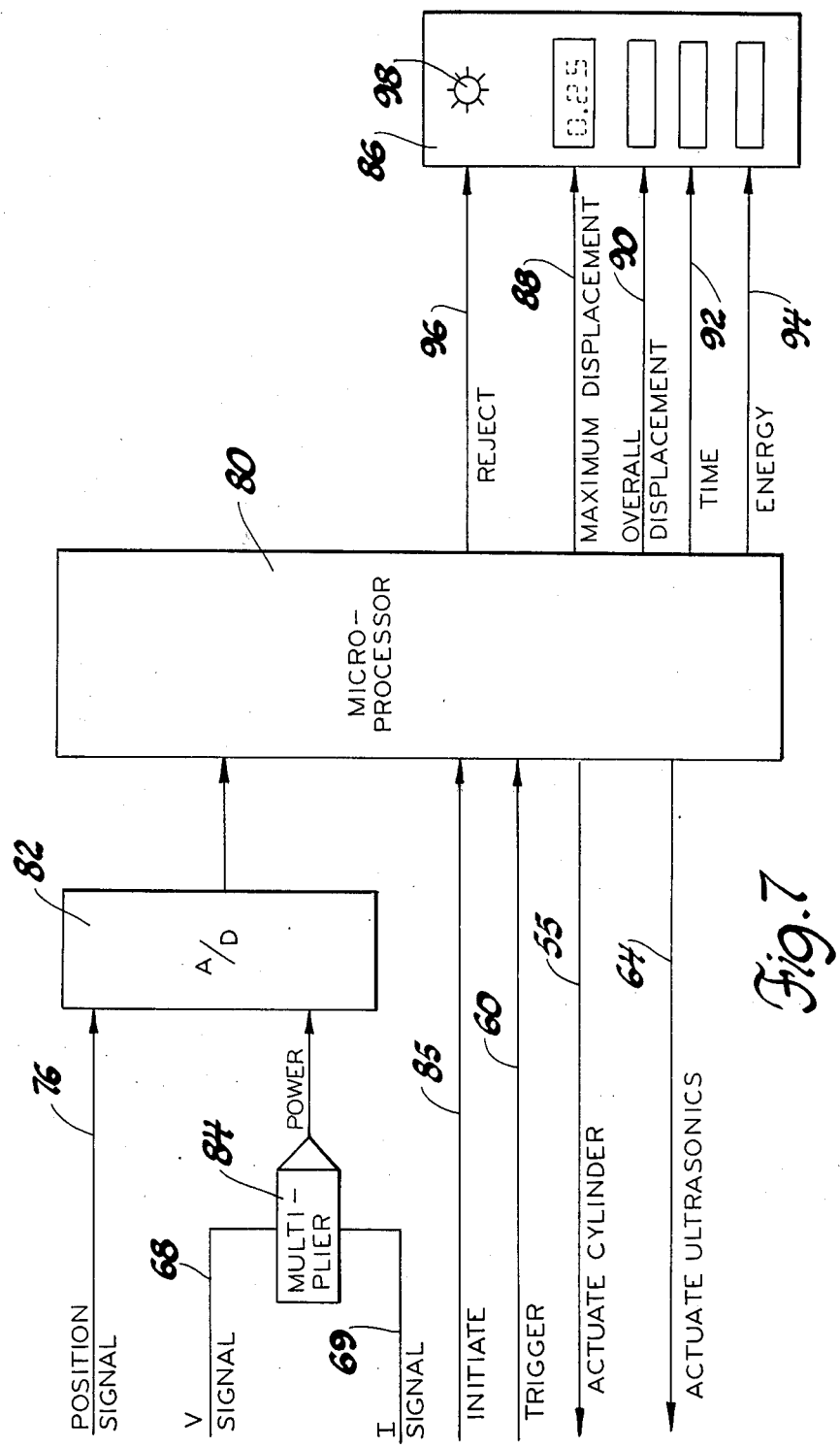
Figure 8:
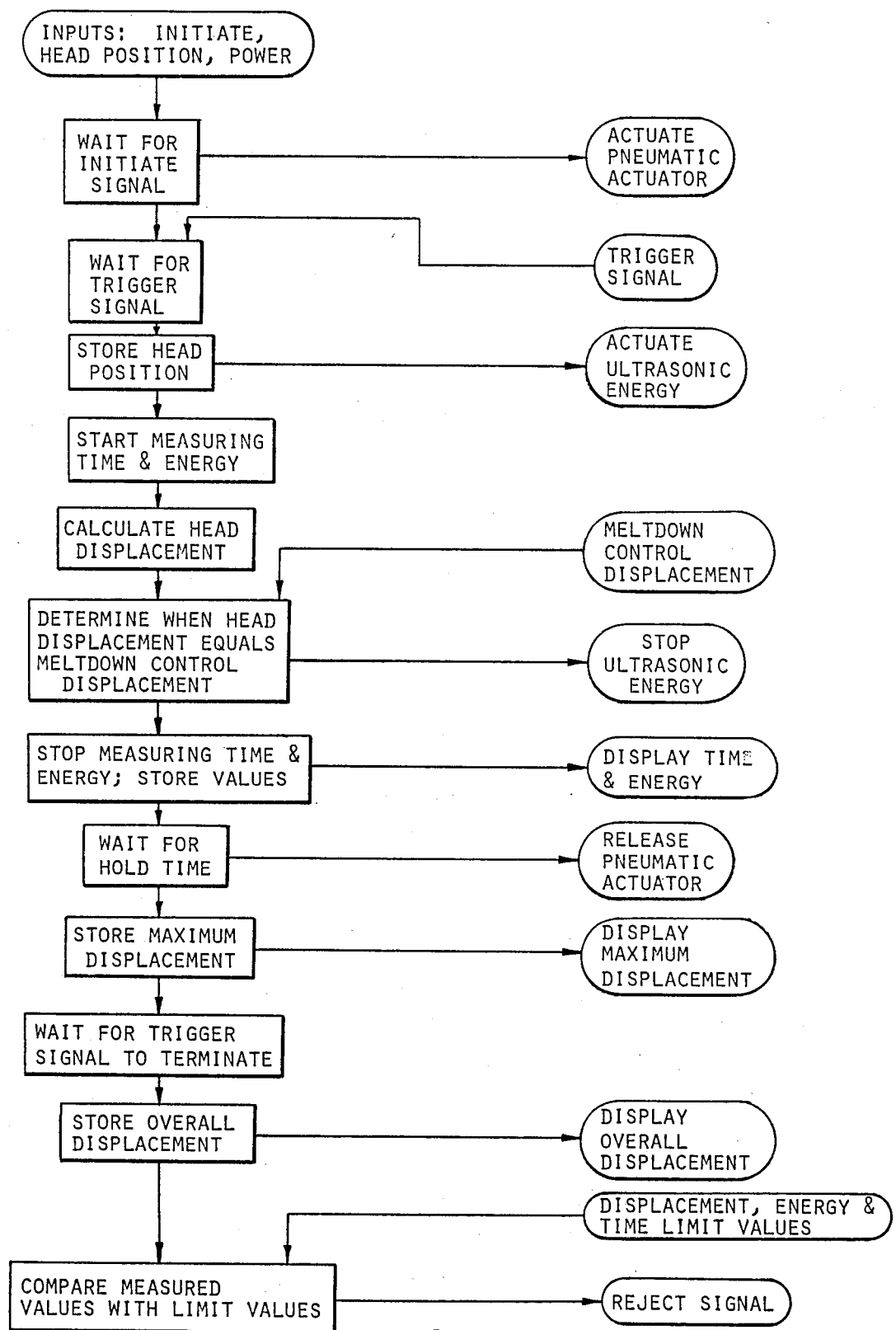

The above and other advantages of the invention will become more apparent from the following description taken in conjunction with the accompanying drawings wherein like reference numerals refer to like parts and wherein, p FIG. 1 is a partial cross-sectional view of a plastic part to be welded positioned in an ultrasonic welding apparatus, FIG. 2 is a partial cross-sectional view of the plastic part of FIG. 1 after being ultrasonically welded, FIG. 3 is a cross-sectional view of a part to be upset by ultrasonic deforming positioned in an ultrasonic deforming apparatus, FIG. 4 is a cross-sectional view of the part of FIG. 3 after the ultrasonic upsetting operation, FIG. 5 is a graph of part deformation versus time during an ultrasonic deformation operation in accordance with the invention, FIG. 6 is a schematic illustration of ultrasonic energy processing apparatus according to the invention, FIG. 7 is a block diagram of a microprocessor controller for the apparatus of FIG. 6, according to the invention, and FIG. 8 is a flowchart illustrating the program of the microprocessor controller of FIG. 7 according to the invention.

In FIG. 1, a plastic vacuum actuator comprises saucer shaped upper and lower thermoplastic case members 10 and 12 respectively which are to be welded together ultrasonically around the peripheral flanges 14 and 16 of the upper and lower cases respectively. A diaphragm 18 is trapped at its perimeter between the flanges 14 and 16. The diaphragm 18 has an enlarged rim 20 to be held between the casing flanges. The flange 16 of the lower casing has an inner rib 22 extending toward the flange 14 and a sharp ridge 24 outwardly spaced from the rib 22 extends toward the upper flange 14 a distance greater than that of the rib 22. An annular trough between the rib 22 and the ridge 24 receives the rim 20 of the diaphragm 18. The sharp ridge 24 serves as an energy director which causes a concentrated line contact between the two flanges. When ultrasonic energy is applied to this area, the energy is concentrated along the line contact which causes the plastic of the ridge to melt and fuse into the contact region of the upper flange. As the ridge 24 or energy director is deformed, it clamps the diaphragm between the upper and lower flanges. The amount of resulting diaphragm compression is a critical parameter and thus the amount the energy director melts down and its original height are very important. The original height of the energy director or ridge 24 relative to that of the rib 22 is a function of the plastic mold and molding process and is accurately controlled during its manufacture. The ultrasonic weld controller must control the amount of meltdown in order to obtain the proper amount of diaphragm compression as well as to insure a sound weld having high mechanical strength and affording an air tight joint as shown in FIG. 2. As shown in FIG. 1, the combined flange thickness prior to welding is the dimension "a" and as shown in FIG. 2 the resultant flange thickness is "b". Thus the required amount of deformation is a−b, both values being measured under the same conditions. FIG. 1 also shows a steel nest or support fixture 26 to firmly locate and rigidly support the plastic assembly at the lower surface of the flange 16 and an annular ultrasonic welding horn 28 for engaging the upper surface of the flange 14.

The proposals to use absolute dimensional controls for plastic welding, that is, controlling the weld so that outer dimensions of the case (say, the upper and lower surfaces of flanges 14 and 16 respectively) are at a fixed separation "b", suffers from two problems; i.e., the springiness of the plastic parts and the flange thicknesses of the parts, both of which may legitimately vary in good quality parts. Thus according to the absolute dimensional control approach it is vital to control the manufacture of the casings 10 and 12 so that the flange thicknesses would always be the same, as well as to control the dimensions of the ridge 24 and rib 22, even though the exact flange thicknesses may not be important to product quality. According to the present invention, however, only the rib 22 and ridge 24 sizes must be accurately controlled.

FIGS. 3 and 4 illustrate another application of the present invention where upsetting or staking any plastic part is performed by ultrasonic deforming to secure metal inserts 30 to a plastic casing 32, where the casing is formed with outstanding pins or teeth 34 adjacent the inserts 30. As shown in FIG. 3 the assembly is supported on a base 36 and the ultrasonic horn 38 presses against the tops of the pins 34. When the ultrasonic energy is applied to the pins to soften them, plastic flow or upsetting occurs so that, as shown in FIG. 4, the pins 34 in the finished product are spread out to at least partially cover the tops of the metal inserts 30. Dimensional control of the amount of plastic deformation is critical because too little upset is not adequate to retain the metal inserts 30 and too much upset will cause damage to either the plastic part 32 or to the inserts.

It will be seen that according to this invention the ultrasonic plastic welding and ultrasonic upset of plastic material both require ultrasonic deformation of plastic material and dimensional control of the amount of deformation. The present invention applies equally well to both welding and upsetting and these are referred to generically herein as ultrasonic processing. However, it is apparent that the work being processed may involve just one plastic part as in the case of upsetting or more than one part as in the case of welding.

In accordance with the present invention the deformation of plastic material is dimensionally controlled through a differential head travel technique; that is, the position of the ultrasonic horn or the head is monitored throughout the entire weld cycle. In the graph of FIG. 5 the head travel is displayed on the vertical axis starting at an arbitrary position at time $t_0$ where the head engages the work to apply force to the work. As that force increases the head travels a slight amount due to the springiness of the plastic part. At the time $t_1$ predetermined force is applied to the part and this force is detected and used to initiate the application of ultrasonic energy to the part and to command that the displacement of the head be stored for use as a reference value. In the usual case, the operating force is greater than the trigger force so that some displacement occurs due to continued force increase. The chief contribution to head displacement, however, is the deformation caused by plastic meltdown. From the trigger point the continuing head travel is monitored and when it reaches a predetermined displacement from the trigger level, which is termed the "meltdown control displacement", the ultrasonic energy is turned off. This occurs at time $t_2$. The head force is maintained during a fixed hold period between time $t_2$ and $t_3$ and the head travel continues at a low rate. Maximum displacement occurs at time $t_3$, that value is recorded and the head force is released so that due to springiness of the part, the head moves upwardly. When the trigger force is reached during the force release action at time $t_4$, the head position is again measured to establish the overall displacement which occurs at $t_4$. The overall displacement then is again a comparison of the head position before and after ultrasonic processing measured with the same amount of force applied to the work and thus represents the dimensional change in the work due to the plastic deformation. The desired overall displacement is established by the design requirements of the product and the measured overall displacement is compared with preset tolerance limits to inspect the part. A reject signal is issued if the part is not within the required limits.

To set up the process for a particular product the overall displacement is achieved by empirically selecting a meltdown control displacement which results in the required overall displacement. As indicated in the graph of FIG. 5, the meltdown control displacement is typically slightly larger than the overall displacement. Since the meltdown control displacement is the value used to determine the termination of ultrasonic energy, it is the primary control parameter in the ultrasonic process. The maximum displacement is not used as a control value however, that information is useful to the process operator in analyzing problems which may occur or in determining the setup parameters. Anomalies in the maximum displacement are indicative of processing or part deficiencies.

As shown in FIG. 6, an apparatus for upsetting or welding a work 40 supported on a base 41 includes a vertically moveable slide 42 mounted on a base 44. The slide 42 supports the ultrasonic head 46 which terminates in a horn 48 that can be lowered against an upper surface of the work 40. A pneumatic actuator 50 coupled through a solenoid controlled four-way valve 52 to an air supply line 54 controllably applies force to the slide and thus through the ultrasonic head 46 to the work 40. An electrical control line 55 is coupled to the solenoid of the valve 52. A trigger switch 56 which responds to force is interposed between the pneumatic actuator 50 and the slide 42. The switch 56 includes a coil spring which is compressed according to the amount of force applied to the head 46 and a pair of contacts 58 are set to close during force application when the force reaches a predetermined trigger level and to open during force release when the force drops below the trigger level. Line 60 coupled to the contacts 58 carries the resulting trigger signal. An ultrasonic power supply 62 activated upon command from an activation line 64 supplies ultrasonic power to the ultrasonic head 46. A voltage and current interface 66 between the power supply and the head measures those parameters and produces a voltage signal and a current signal on output lines 68 and 69 respectively.

As thus far described, the ultrasonic apparatus is conventional. To adapt the apparatus to the present invention, however, it is necessary to produce an electrical signal which is a measure of the head position with reference to the machine base. To that end an eddy current proximity sensor 68 is used and comprises an aluminum target 70 carried by a bracket 72 which is mounted on and moves with the machine slide 42, and a stationary sensor coil 74. When the coil 74 is energized in a manner which is well known in the art, it produces an output signal on line 76 which is a measure of the distance of the target 70 from the sensor coil 74. Thus the measurement signal on line 76 is a continuous measure of the position of the ultrasonic head 46. Since the head is in contact with the surface of the work 40, the head displacement is a measure of the work surface displacement.

FIG. 7 illustrates the microprocessor based control for the ultrasonic processing apparatus. That control includes a microprocessor 80 having inputs from the trigger signal line 60 and a head position signal from line 76 conditioned by an analog-to-digital converter 82. In addition, the voltage and current signals on line 68 and 69 are multiplied in a multiplier 84 and the resulting power signal is processed by the A/D converter 82 to provide a further input to the microprocessor 80. An initiate signal on line 85 is provided to start the ultrasonic process. The microprocessor produces outputs on line 55 for pneumatic actuator 50 actuation and on line 64 to actuate the ultrasonic power supply. In addition, several values output from the microprocessor are numerically displayed on a readout panel 86. The measured maximum displacement and overall displacement are output on lines 88 and 90 respectively to the readout panel 86 and the measured time and computed energy values are output on lines 92 and 94 respectively to the readout panel. The microprocessor compares the overall displacement, the weld time and the weld energy to preset tolerance limits and issues a reject signal on line 96 to illuminate a reject lamp 98 on the readout panel 86. Additionally, the reject signal can be used for machine control.

The microprocessor 80 is programmed to carry out the process according to the invention as illustrated in the flow chart of FIG. 8. The process initiate signal, the head position signal and the power signal are supplied to the microprocessor which waits for the initiating signal and then produces an output to actuate the air cylinder. Then the microprocessor waits for the trigger signal and stores the head position at the time of the trigger signal and causes actuation of the ultrasonic energy; simultaneously it starts to measure time and energy. The microprocessor continuously calculates head displacement. When the head displacement reaches the meltdown control displacement which is a constant value, the microprocessor issues a signal to stop the ultrasonic energy and simultaneously it stops measuring the time and energy. It stores the total time and energy values and displays those values on the readout. Then the microprocessor waits for the hold time to elapse and at the end of that time issues a command to release the air cylinder. Simultaneously the microprocessor stores the maximum head displacement value and causes that value to be displayed at the readout. Then when the air cylinder force is sufficiently relieved to terminate the trigger signal, the microprocessor stores the overall displacement at the trigger point and causes display of the overall displacement. Finally, the microprocessor compares the measured values of energy, time and overall displacement and with limit values that are fed into the microprocessor as constants. When any one of the parameters is outside the limit values, a reject signal is issued by the microprocessor causing illumination of the lamp 98 on the readout panel.

It will thus be seen that according to this invention the ultrasonic energy processes of plastic welding or plastic upsetting are controlled as a function of a displacement of the ultrasonic head which is the same thing as the displacement of the surface of the plastic part contacting the head thereby controlling the change in work dimensions and at the same time comparing the dimensional change to preset standards to inspect each work as it is processed.

The embodiments of the invention in which an exclusive property or privilege is claimed are defined as follows:

1. A method of dimensional control in ultrasonic processing of work comprising one or more plastic parts to be deformed, comprising the steps of;
    applying force to a surface of the work and sensing a preset force value,
    when the preset force value is attained, measuring the surface position to establish an initial dimension and initiating ultrasonic energy application to the work,
    monitoring surface displacements occurring after initiating the ultrasonic energy,
    terminating ultrasonic energy when the surface displacement reaches a preset value,
    then maintaining force on the surface for a hold period and thereafter releasing the force, and
    measuring overall surface displacement after the hold period when the force is at the preset value, thereby determining the dimensional change due to deformation of the work.

2. A method of dimensional control in ultrasonic processing of work comprising one or more plastic parts to be deformed, comprising the steps of;
    applying force to a surface of the work and sensing a preset force value,
    when the preset force value is attained, measuring the surface position to establish an initial dimension and initiating ultrasonic energy application to the work,
    monitoring surface displacements occurring after initiating the ultrasonic energy,
    terminating ultrasonic energy when the surface displacement reaches a preset value,
    then maintaining force on the surface for a hold period and thereafter releasing the force,
    measuring overall surface displacement after the hold period when the force is at the preset value, thereby determining the dimensional change due to deformation of the work, and
    comparing the overall surface displacement with predetermined limits to determine dimensional acceptability of the work.

3. A method of dimensional control in ultrasonic processing of work comprising one or more plastic parts to be deformed, comprising the steps of;
    applying an operating force to a surface of the work and sensing a preset force value less than the operating force,
    when the preset force value is attained, measuring the surface position to establish an initial dimension and initiating ultrasonic energy application to the work,
    monitoring surface displacements occurring after initiating the ultrasonic energy,
    terminating ultrasonic energy when the surface displacement reaches a preset value,
    then maintaining force on the surface for a hold period,
    measuring the maximum surface displacement at the operating force, whereby anomalies in the maximum surface displacement are indicative of processing or part deficiencies, and
    releasing the force and measuring overall surface displacement after the hold period when the force is at the preset value, thereby determining the dimensional change due to deformation of the work.

4. A method of dimensional control in ultrasonic processing of work comprising one or more plastic parts to be deformed, comprising the steps of;

applying an operating force to a surface of the work and sensing a preset force value less than the operating force, when the preset force value is attained, measuring the surface position to establish an initial dimension and initiating ultrasonic energy application to the work, measuring ultrasonic power and calculating the applied ultrasonic energy, measuring the time duration of ultrasonic energy application, monitoring surface displacements occurring after initiating the ultrasonic energy, terminating ultrasonic energy when the surface displacement reaches a preset value, then maintaining force on the surface for a hold period, measuring the maximum surface displacement at the operating force, whereby anomalies in the maximum surface displacement are indicative of processing or part deficiencies, releasing the force and measuring overall surface displacement after the hold period when the force is at the preset value, thereby determining the dimensional change due to deformation of the work, and comparing the measured time, energy and overall surface displacement to preset limit values to determine acceptability of the work.

5. Apparatus for ultrasonic processing work comprising one or more plastic parts comprising;

a head for contacting a part surface for applying force and ultrasonic energy to the work, means for supplying ultrasonic energy to the head, means for measuring the position of the head and generating a position signal, means for detecting a minimum applied force and generating a trigger signal when at least the minimum force is present, and a control system responsive to the trigger signal and the position signal including a microprocessor programmed to:

(a) store an initial head position value and initiate the supply of ultrasonic energy to the head when the trigger signal is received, (b) determine when the head travel subsequent to receipt of the trigger signal reaches a preset value and then terminate the supply of ultrasonic energy, (c) wait for a preset hold time to elapse, (d) release the force on the part to effect removal of the trigger signal, (e) measure the final head position value when the trigger signal is removed, and (f) determine the overall head displacement from the intitial and final head position values.

6. Apparatus for ultrasonic processing work comprising one or more plastic parts comprising a head for contacting a part surface for applying force and ultrasonic energy to the work, means for supplying ultrasonic energy to the head,
means for measuring the position of the head and generating a position signal, means for detecting a minimum applied force and generating a trigger signal when at least the minimum force is present, and a control system responsive to the trigger signal and the position signal including a microprocessor programmed to:

(a) store an initial head position value and initiate the supply of ultrasonic energy to the head when the trigger signal is received, (b) determine when the head travel subsequent to receipt of the trigger signal reaches a preset value and then terminate the supply of ultrasonic energy, (c) wait for a preset hold time to elapse, (d) release the force on the part to effect removal of the trigger signal, (e) measure the final head position value when the trigger signal is removed, (f) determine the overall head displacement from the intitial and final head position values, and (g) compare the overall head displacement to preset limits to determine work acceptability.

7. Apparatus for ultrasonic processing work comprising one or more plastic parts comprising a head for contacting a part surface for applying force and ultrasonic energy to the work, means for supplying ultrasonic energy to the head, means for measuring the position of the head and generating a position signal, means for detecting a minimum applied force and generating a trigger signal when at least the minimum force is present, and a control system responsive to the trigger signal and the position signal including a microprocessor programmed to:

(a) store an initial head position value and initiate the supply of ultrasonic energy to the head when the trigger signal is received, (b) determine when the head travel subsequent to receipt of the trigger signal reaches a preset value and then terminate the supply of ultrasonic energy, (c) measure the ultrasonic energy applied and its time of application, (d) wait for a preset hold time to elapse, (e) release the force on the part to effect removal of the trigger signal, (f) measure the final head position value when the trigger signal is removed, (g) determine the overall head displacement from the intitial and final head position values, and (h) compare the overall head displacement, the measured energy and the measured time to preset limits to determine acceptability of the processed work.

8. Apparatus for ultrasonic processing work comprising one or more plastic parts comprising a head for contacting a part surface for applying force and ultrasonic energy to the work, means for supplying ultrasonic energy to the head,
means for measuring the position of the head and generating a position signal,
means for detecting a minimum applied force and generating a trigger signal when at least the minimum force is present,
a display panel for displaying process parameters, and a control system responsive to the trigger signal and the position signal including a microprocessor programmed to:
(a) store an initial head position value and initiate the supply of ultrasonic energy to the head when the trigger signal is received,
(b) determine when the head travel subsequent to receipt of the trigger signal reaches a preset value and then terminate the supply of ultrasonic energy,
(c) measure the ultrasonic energy applied and its time of application,
(d) wait for a preset hold time to elapse,
(e) release the force on the part to effect removal of the trigger signal,
(f) measure the final head position value when the trigger signal is removed,
(g) determine the overall head displacement from the intitial and final head positon values, and
(h) activate the display panel to display the overall head displacement, the measured time, and the measured energy.

* * * * *